June 16, 1942.  D. B. LIVINGSTON  2,286,862
CLUTCH
Filed Jan. 27, 1941
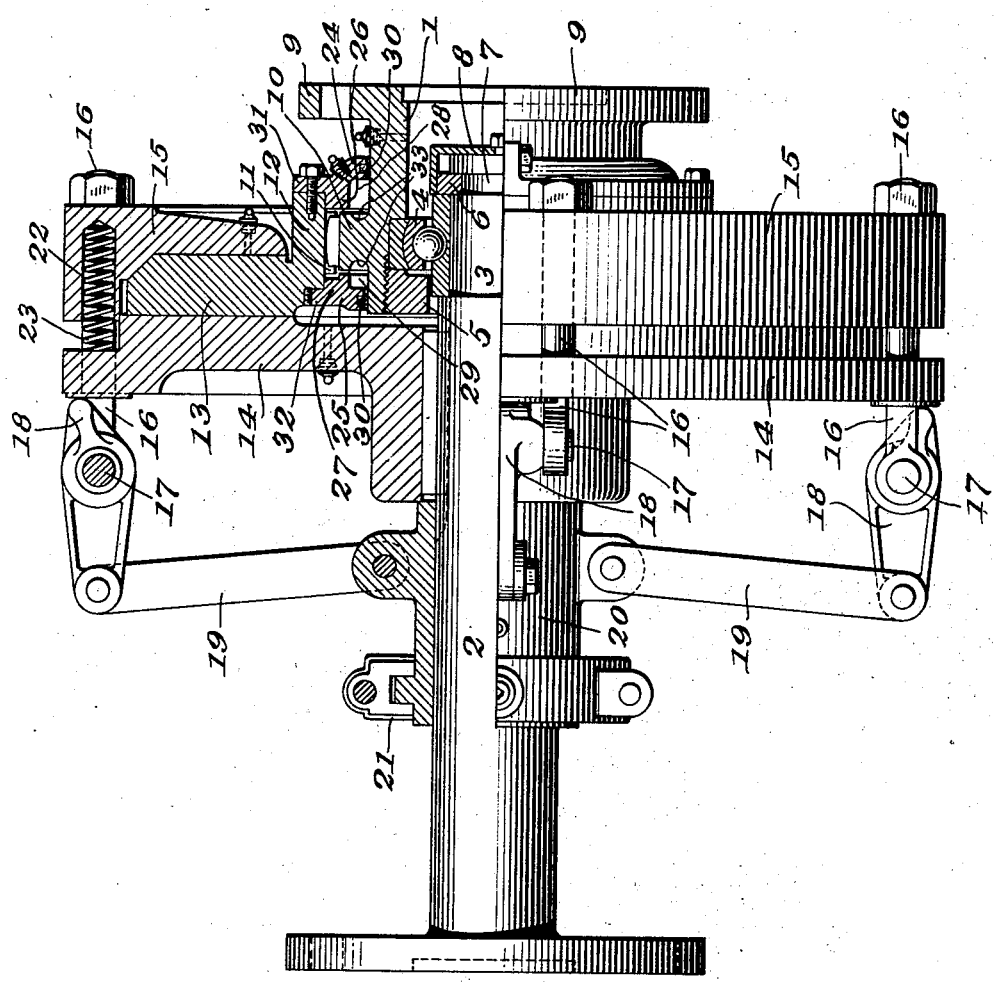
Inventor
Donald B. Livingston
By
Spear, Rawlings & Spear
Attorneys.

Patented June 16, 1942

2,286,862

UNITED STATES PATENT OFFICE 2,286,862

CLUTCH

Donald B. Livingston, Beverly, Mass., assignor to Kinney Manufacturing Company, Jamaica Plain, Mass., a corporation of Massachusetts Application January 27, 1941, Serial No. 376,051

15 Claims. (Cl. 192—68)

My present invention relates to improvements in clutches of the friction disc type by which back lash is hydraulically controlled.

In many power transmission installations including a clutch, the elimination of vibration has been a difficult and important problem since the presence of vibration has been a cause of mechanical failure wherever back lash may be present. Because of essential manufacturing tolerances in the component clutch parts, back lash in clutches of the friction disc type is mechanically unavoidable.

To a considerable extent, back lash is traceable to the spline by which a clutch disc or plate is slidably attached to one of the members to be coupled. In accordance with my concept, I eliminate back lash having its origin in the splines by providing a chamber, inclusive of the spline, for a viscous fluid which, under the influence of centrifugal force, fills the back lash voids in the spline.

The viscous fluid is, of course, forced out from the driving side of the splines, but remains as a filler under pressure for back lash voids. Since vibration frequency is relatively rapid, I am able to provide an effective vibration dampener by employing as a void filler a liquid having a relatively low flow frequency. Such a fluid, under the pressure developed by centrifugal force, remains in the voids preventing the relative motion between the splined clutch parts normally productive of back lash.

Since in coupling the prime mover with the driven element it is impossible to establish perfect alinement, it must be assumed that to some degree angular misalinement of the drive and driven elements is always present and such misalinement, of itself, contributes more complex vibration factors.

For that reason, my present invention provides for clutch flexibility by means of a self-alining bearing and spherically faced external splines each having a common center at the axis of the shaft.

By this construction, I provide a flexible clutch permissive of angular shaft misalinement without strain on the connecting elements and an effective vibration dampener by which long, efficient clutch operation is ensured.

In the accompanying drawing, I have shown an embodiment of my invention in a clutch structure, partly sectioned to permit its several novel features and advantages to be readily appreciated.

At 1 I have indicated a hollow drive shaft and at 2 a driven shaft as typical of elements to be coupled. The drive shaft 1 receives the shouldered end 3 of the driven shaft 2 and is counterbored to receive the bearing 4 and the ring 5 by which the bearing 4 is locked between it and the split ring shoulder 6 held in its groove 7 by a keeper 8 bolted to the end 3 of the shaft 2. The bearing 4 is conventional and preferably is of the self-alining type in order to provide flexibility and ensuring efficient clutch operation even where the shafts are angularly misalined. While the bearing 4 may be conventional, the assembly just described is particularly effective in that a two-way thrust bearing within the clutch is provided simplifying installation by eliminating the necessity of bearings externally of the clutch to take care of thrust factors.

The drive shaft 1 includes a flange 9 for attachment, for example, to the fly wheel (not shown) of a prime mover and carries a gear 10, the teeth of which enter between teeth 11 formed in the bore of the hub 12 of the clutch disc or plate 13 to slidably spline the disc 13 to the drive shaft 1. While the disc 13 may be otherwise splined to the shaft 1, the illustrated construction is preferable in that gears are universally available and they may be formed with spherical teeth having a center at the axis of the shaft common to the center of the self-alining bearing 4 thereby providing flexibility permitting positive clutch engagement even if the drive and driven elements are angularly misalined.

The backing plate 14 is keyed to the driven shaft 2 and slidably supports the clamping plate 15 by means of pairs of bolts 16, the ends of which support the pivots 17 for the cams 18. Links 19 are pivotally connected to the cams 18 and to the shifter sleeve 20 on the shaft 2 to actuate the cams 18 to draw the clamping plate 15 towards the backing plate 14 to clamp the clutch disc 13 therebetween. The sleeve 20 carries a shifter ring 21 for the shifting mechanism (not shown). The clamping plate 15 is bored as at 22 intermediate each pair of bolts 16 to receive springs 23 in contact with the backing plate 14 urging the clamping plate 15 into a position wherein the clutch is disengaged.

In accordance with my present invention, I hydraulically control back lash tendencies inherent in the spline between the driving element 1 and the clutch disc 13. I accomplish this result by means of sealing rings 24 and 25 having annular bosses 26 and 27 to fit snugly within the recesses in the hub 12 out of contact with the teeth 11 to define a trough preferably establishing a pair of chambers 28 and 29 interconnected through the voids in the spline. The rings 24 and 25 carry packing seals 30 of any suitable material to seal the space between the rings 24 and 25 and the shaft 1 against dirt and moisture without interfering with the flexibility of the clutch structure necessary to permit its efficient operation. The rings 24 and 25 include attaching flanges 31 and 32 to permit attachment to the ends of the hub 12. The hub 12 is counterbored to receive the flange 32 while the ring 24 is provided with a suitable conventional grease fitting through which the viscous liquid is admitted to the chambers 28 and 29.

The rings 24 and 25 are spaced from the gear 10 to ensure the free flow of the liquid under the influence of centrifugal force into the back lash voids in the spline and to avoid interference with clutch flexibility. To increase the capacity of the chambers 28 and 29, I have undercut the gear 10 as at 33. The capacity of the chambers 28 and 29 must be such as to define a trough or pocket for the liquid greater than the capacity of the voids and they must be adapted so that when the shaft 1 is rotated the liquid under centrifugal force positively fills under pressure the back lash voids.

Because vibration frequency is relatively rapid, by using a liquid having a relatively low flow frequency, the voids are effectively filled against back lash tendencies. I have found that a satisfactory liquid is a lubricant such as 600W or 140 S. A. E. oil. Other lubricants may be used provided that their flow frequency is substantially less than the vibration frequency factors which may vary in different installations. In order to ensure most efficient operation, the heaviest lubricant should be used that is fluid at the lowest temperature expected.

Clutches in accordance with my invention are easy to install because of their flexibility and because thrust factors may be disregarded and the effective dampening of back lash ensures a maximum of efficient service.

What I therefore claim and desire to secure by Letters Patent is:

1. A clutch comprising a drive member, a driven member and means to couple said members, said coupling means comprising a backing plate and a slidable clamping plate carried by one of said members, and a clutch plate intermediate said first named plates, a gear carried by said drive member, said clutch plate including a hub having an axial bore grooved to receive the teeth of said gear to establish a spline slidably locking said clutch plate to said drive member, rings attached to each end of said hub to define with said gear a pair of annular chambers and relatively restricted passages in communication with said spline, said chambers being adapted to hold, when the members are at rest, a sufficient volume of a viscous fluid to fill under the influence of centrifugal force the voids in said spline to eliminate back lash productive of chatter and increased back lash.

2. The clutch of claim 1 in which the teeth of said gear are spherical whereby said spline permits angular misalinement of said members and said sealing rings are spaced from said gear and said drive member, and carry means to seal the space between said rings and said drive member.

3. A clutch comprising a drive member, a driven member, and means to couple said members, said coupling means comprising a backing plate and a slidable clamping plate carried by one of said members, and a clutch plate intermediate said first named plates, said clutch plate including a hub having a grooved axial bore, a gear carried by the other of said members with its end exposed, the teeth of said gear entering said grooved axial bore to establish a slidable spline for said clutch plate, a pair of sealing rings each having an annular boss to fit snugly within one end of said hub bore and each having a flange for attachment to said hub establishing an annular trough defining a circular segment-shaped reservoir for a viscous liquid when the members are at rest, the width of said trough being increased between the root diameter of the teeth of said gear and the edges of said flange so that said reservoir has sufficient capacity for a volume of liquid adequate to seal the back lash voids under the influence of centrifugal force when the gear carrying member is rotated.

4. The clutch of claim 3 in which the gear is undercut to increase the capacity of said reservoir.

5. The clutch of claim 3 in which the sealing ring adjacent the end of the member to which said gear is splined is wholly within the plane defined by the end of said member.

6. The clutch of claim 3 in which one of said members to be coupled is formed with an axial recess receiving the end of the other of said members and a bearing is located in said recess between said members.

7. A clutch comprising a drive member, a driven member, one of said members having an axial bore to receive freely the end of the other of said members, means to couple said members comprising a backing plate and a slidable clamping plate carried by one of said members, a clutch plate intermediate said first named plates, and means to actuate said coupling means, a spline slidably locking said clutch plate to the other of said members, and a two way thrust bearing in said axial bore between said drive and driven members, said thrust bearing including a pair of races, each of said members being formed to present a shoulder against which one of said races is seated and a ring carried by each one of said members to retain each of said races against its shoulder.

8. A clutch comprising a drive member, a driven member, one of said members having an axial bore to receive freely the end of the other of said members, means to couple said members comprising a backing plate and a slidable clamping plate carried by one of said members, a clutch plate intermediate said first named plates, and means to actuate said coupling means, a spline slidably locking said clutch plate to the other of said members, a two way thrust bearing in said axial bore between said drive and driven members, said thrust bearing including a pair of races, each of said members being formed to present a shoulder against which one of said races is seated and a ring carried by each one of said members to retain each of said races against its shoulder, and means defining a chamber for a viscous fluid inclusive of said spline, said chamber being adapted to hold a sufficient volume of said liquid to fill the voids in said spline positively when subjected to centrifugal force.

9. A clutch comprising a drive member, a driven member, one of said members having an axial bore to receive freely the end of the other of said members, means to couple said members comprising a backing plate and a slidable clamping plate carried by one of said members, a clutch plate intermediate said first named plates, and means to actuate said coupling means, said clutch plate having an axial bore having grooves thereon, a gear on the other of said members, said gear having spherical teeth entrant of said grooves to establish a spline slidably locking said clutch plate to the other of said members, and a two way self-alining thrust bearing in said axial bore between said drive and driven members, said thrust bearing including a pair of races, each of said members being formed to present a shoulder against which one of said races is seated and a ring carried by each one of said members to retain each of said races against its shoulder, said spline and said self-alining bearing having a common center at the axis of said members.

10. A clutch comprising a drive member, a driven member, one of said members having an axial bore to receive freely the end of the other of said members, means to couple said members comprising a backing plate and a slidable clamping plate carried by one of said members, a clutch plate intermediate said first named plates, and means to actuate said coupling means, said clutch plate having an axial bore having grooves thereon, a gear on the other of said members, said gear having spherical teeth entrant of said grooves to establish a spline slidably locking said clutch plate to the other of said members, a two way self-alining thrust bearing in said axial bore between said drive and driven members, said thrust bearing including a pair of races, each of said members being formed to present a shoulder against which one of said races is seated and a ring carried by each one of said members to retain each of said races against its shoulder, said spline and said self-alining bearing having a common center at the axis of said members, and means defining a chamber inclusive of said spline for a viscous liquid, said chamber being of a capacity to hold a sufficient volume of liquid to fill the voids in said spline positively when subjected to centrifugal force.

11. A clutch comprising a drive member, a driven member, one of said members having an axial bore to receive freely the end of the other of said members, means to couple said members comprising a backing plate and a slidable clamping plate carried by one of said members and a clutch plate intermediate said first named plates, means to actuate said coupling means, a spline slidably locking said clutch plate to the other of said members, and a two-way thrust bearing in said axial bore between said drive and driven members, said bearing and said spline each being adapted to permit angular misalinement of said members to be coupled and each having a center common to the other at the axis of said members.

12. A clutch comprising drive and driven members, a clutch member, said clutch member and one of said first-named members having internal and external spline portions establishing a slidable connection, a pair of annular portions carried by the member having the internal spline portion adjacent opposite ends of the internal spline and establishing with said internal spline an annular trough inclusive of said slidable connection, said trough having an outside diameter substantially equal to the root diameter of said internal spline establishing a substantially circular segment-shaped reservoir when the members are at rest, the trough being of increased axial width intermediate the root diameter of the external spline portion and the axis of the members to make said reservoir of a capacity to hold a sufficient volume of the liquid to fill positively all the voids in the slidable connection when the members are rotated.

13. The clutch of claim 12, in which the capacity of the trough is secured by undercutting the external spline portion interiorly of its root diameter.

14. The clutch of claim 12, in which the capacity of the trough is secured by providing said trough establishing portions with laterally disposed annular pockets.

15. A clutch comprising a drive member, a driven member and a clutch member, said clutch member and one of said first-named members including complemental internal and external spline portions establishing a slidable connection, the member having the internal spline portion including inwardly disposed portions establishing a trough having its maximum internal diameter substantially equal to the root diameter of the internal spline and defining with said external spline portion a pair of annular reservoirs having their maximum diameter substantially equal to the root diameter of the external spline and relatively restricted passages in communication with said slidable connection, said reservoirs holding, when the members are at rest, a sufficient volume of liquid to fill the voids in said slidable connection under the influence of centrifugal force when the slidable interconnected members are rotated thereby to eliminate backlash productive of chatter and wear.

DONALD B. LIVINGSTON.